Nov. 14, 1961 — J. A. McADAMS — 3,008,504
GRATER
Filed Sept. 15, 1958
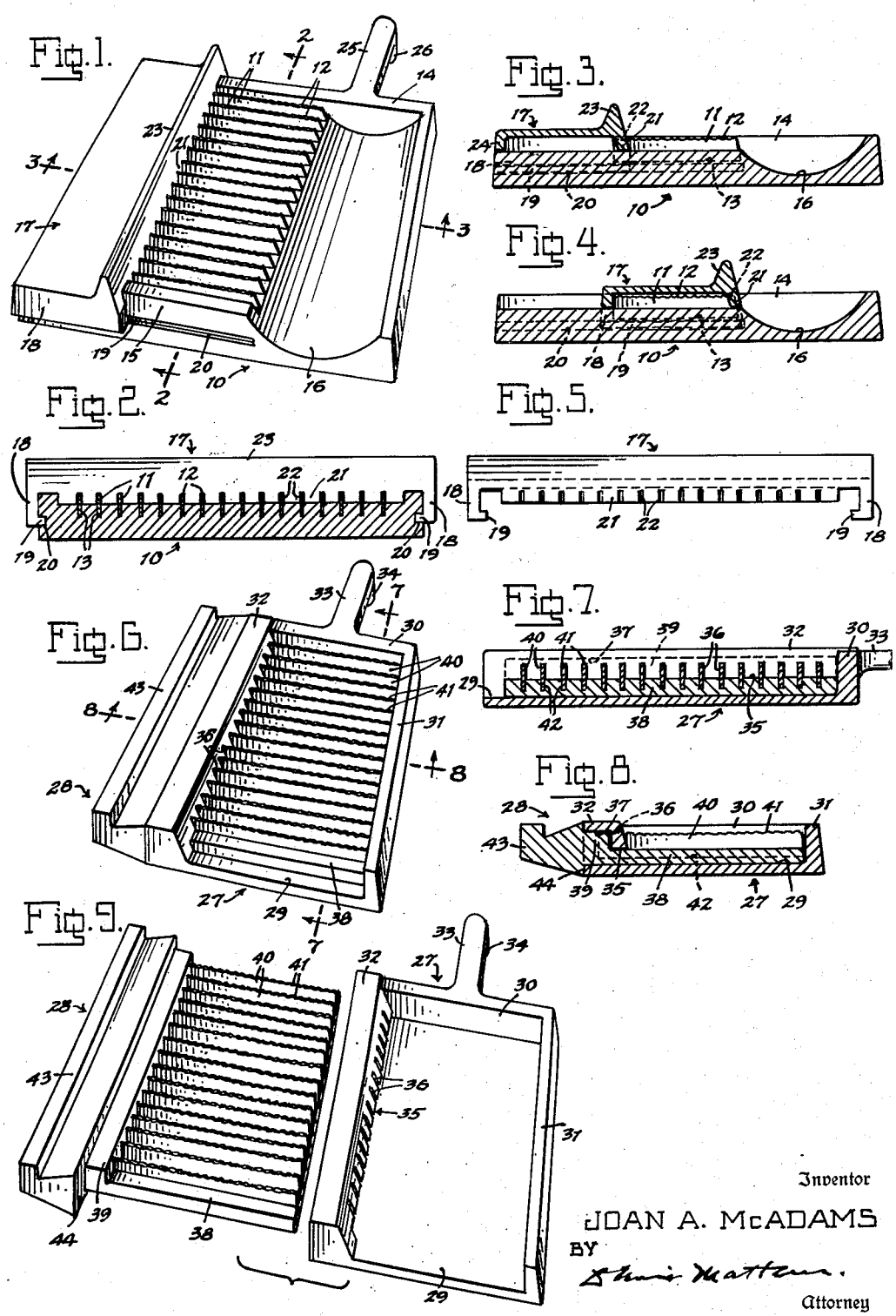
Inventor
JOAN A. McADAMS
BY
Attorney United States Patent Office 3,008,504
Patented Nov. 14, 1961

3,008,504
GRATER
Joan A. McAdams, Newtown, Conn.
(734 Lincoln Ave., Winnetka, Ill.)
Filed Sept. 15, 1958, Ser. No. 760,923
5 Claims. (Cl. 146—180)

The present invention relates to a grater, particularly for the grating of fruits, vegetables and the like, and has for an object to provide a grater of simple and inexpensive construction, attractive in appearance, capable of easy and thorough cleaning, and in which the grating operation may be effectually carried out.

It is particularly proposed to provide a grater including a grating part having a series of spaced grating elements providing spaces between them in which the grated particles collect, and further to provide scraper means adapted to be actuated upon completion of the grating operation to remove the grated particles from the spaces in which the grated particles are collected.

A further object is to provide a grater having receptacle means in which the grated particles are adapted to be received.

Other objects and advantages of the invention will become apparent from a consideration of the following detailed description taken in connection with the accompanying drawings wherein satisfactory embodiments of the invention are shown. However, it will be understood that the invention is not limited to the details disclosed but includes all such variations and modifications as fall within the spirit of the invention and the scope of the appended claims.

In the drawings:

FIG. 1 is a perspective view of the grater according to one embodiment of the invention, the same being shown in its normal operating position;

FIG. 2 is a longitudinal sectional view taken along the line 2—2 of FIG. 1;

FIG. 3 is a transverse sectional view taken along the line 3—3 of FIG. 1;

FIG. 4 is a sectional view similar to FIG. 3, and showing the scraper member for removing the grated particles from the grating part in its operative position wherein the particles are removed to the receptacle part;

FIG. 5 is a front elevation of the scraper member separated from the grater;

FIG. 6 is a perspective view of a grater according to a modified form of the invention, the same being shown in its normal operative position;

FIG. 7 is a longitudinal sectional view taken along the line 7—7 of FIG. 6;

FIG. 8 is a transverse sectional view taken along the line 8—8 of FIG. 6; and

FIG. 9 is a perspective view showing the separated position of the grater and receptacle parts, wherein the grated particles are removed from the grater part to the receptacle part.

Referring to the drawings, and more particularly to FIGS. 1–5 thereof, the grater, according to the exemplary embodiment of the invention illustrated therein, comprises a base member 10, generally rectangular in plan and preferably formed of wood or moulded plastic material, and which carries the grater part and the receptacle part, as will presently more fully appear.

The grater part comprises a series of longitudinally spaced parallel blade members 11, preferably in the form of stainless steel strips, having their upper grating edges toothed or serrated as at 12, and lying parallel to the upper surface of the base member whereby the upper edges of the strips provide an effectual upwardly exposed grating surface for engagement by an object to be grated as the latter is moved longitudinally of the base member transversely across the upper grating edges. The blades are set into the base member, and in the case of wood may be set into suitable parallel grooves 13 cut therein, while in the case of moulded plastic they will be moulded as inserts. The toothed or serrated edges 12 are substantially spaced from the surface of the base member, so that their continuous side walls between the edges 12 and the upper surface of the base member constitute the side walls of a series of relatively deep pockets in which a substantial quantity of the grated material will be collected without interfering with the continued grating operation. At one end the base member is provided with a wall 14 extending entirely across it, while at the other end there is provided a wall 15 extending from one side edge to the forward open end of a receptacle recess 16 to one side of which the particle receiving spaces between the grater blades open.

A scraper member 17 is normally disposed over the base member 10 at the side of the grating part opposite the receptacle recess 16, and is provided at its ends with downwardly extending end walls 18 slidably engaged with the outer sides of the walls 14 and 15, horizontal guide ribs 19 being provided at the inner sides of the end walls 18 which engage horizontal guide grooves 20 provided in the outer sides of the walls 14 and 15. At the inner side of the scraper member there is provided a comb portion 21 having a series of notches 22 which receive the blades 11, the comb portion having closely fitting sliding engagement with the sides of the blades and bases of the particle receiving spaces between the blades.

A longitudinal ridge portion 23 extends upwardly from the comb portion, preferably at a slight rearward angle and to a sufficient height to permit the grated particles to gather in front of the scraper member 17 as it is actuated to remove the grated particles from the spaces between the blades. This ridge portion also serves as a pusher handle for convenient sliding of the scraper member 17 during its operation, as will presently more fully appear. The guide slots 20 open to the rearward side of the base member so that the scraper member may be readily removed from the base member 10 for cleaning purposes.

At the rearward edge of the scraper member 17 there is provided a downwardly extending flange 24 which slidably engages the upper surface of the base member between the walls 14 and 15, and which acts as a stop to limit the forward movement of the scraper member by abutting the rearward ends of the blades, as shown in FIG. 4. In this forwardly moved position the scraper member 17 completely covers the blades so that they are protected during storage or handling of the grater. Also, the flange 24 protects the hand against contact with the blades during operation of the scraper member.

At the end of the base member, opposite the open end of the receptacle recess 16, there is provided a handle 25, preferably having a downwardly projecting knob 26 at its outer end which is flush with the under surface of the body member 10, so that the grater may be effectually held in stationary position by pressing downwardly upon the handle 25 to hold the knob 26 in contact with a supporting table.

In operation the fruit, vegetable, or the like, is grated by moving it back and forth across the toothed surfaces of the blades with the scraper member 17 in its retracted position, as shown in FIGS. 1 and 3, the grated particles collecting in the spaces between the blades in substantial quantity without interference with the continued grating operation. When the desired amount of grated material is collected the scraper member 17 is moved to its projected position, as seen in FIG. 4, thus removing the grated particles from between the blades to the receptacle recess 16. They may then be removed with a spoon or the like from the recess 16 or, by means of the handle 25, may be poured from its open end.

In FIGS. 6-9 there is shown a modified form of the invention comprising a receptacle member 27 and a grater member 28 removable with respect to the receptacle member 27. The receptacle member is of generally rectangular form and is provided with a receptacle recess 29 defined at one end by an end wall 30 and along its sides by a side wall 31 and a scraper wall 32, the end of the recess opposite the end wall 30 being open. A handle 33 extends from the wall 30 and is provided at its outer end with a knob 34 adapted to engage the surface of a supporting table in similar manner to the handle 25 of the embodiment shown in FIGS. 1-5. A longitudinal slot 35 is provided along the under side of the scraper wall, and a series of longitudinally spaced blade receiving notches 36 extend upwardly from the slot 35 to thus provide a comb structure, for a purpose presently to more fully appear. The slot 35 opens rearwardly to a shouldered pocket 37 provided at the rearward side of the scraper wall.

The grater member 28 comprises a base 38 of generally rectangular form and of corresponding length and thickness to the length and height of the slot 35 of the receptacle member, so that it is adapted to be slidably engaged through the slot, as seen in FIGS. 3-8, an upwardly extending rib 39 being provided along the rearward edge of the base 38 which is adapted to fit within the pocket 37 of the receptacle member. A series of spaced parallel blades 40, having their upper edges toothed or serrated as at 41, are secured in slots 42 in the base 38, these blades being either fitted into slots cut in the material or moulded therein as inserts.

The blades are arranged so that they slidably fit within the notches 36 of the comb structure of the scraper wall 32 in the engaged position of the parts and extend the full width of the receptacle recess 29, as clearly shown in FIG. 6. A suitably formed handle portion 43 is provided upon the rib 39, its inner side 44 forming a shoulder which abuts the outer side of the scraper wall 32 in the engaged position of the parts.

The grating operation is carried out with the parts in the position as shown in FIGS. 6-8, the grated particles collecting upon the base 38 in the space between the blades. When a suitable quantity has been grated, the grater member is withdrawn to the position as seen in FIG. 9, whereupon the comb structure of the scraper wall removes the grated particles from the spaces between the blades to the receptacle recess 29.

What is claimed is:
1. In a grater, a base member having a longitudinally extending horizontal upper surface, a series of transversely disposed longitudinally spaced parallel blades carried by said base member having their end edges longitudinally aligned and having upper grating edges upwardly spaced from and lying in a plane parallel to said horizontal upper surface of said base member and presenting an upwardly exposed grating surface for supporting engagement of an object to be grated as the latter is moved longitudinally of said base member transversely across said grating edges, and said blades having continuous side walls between said grating edges and the upper surface of said base member defining with said upper surface of said base member a series of pockets of substantial depth for receiving a substantial quantity of grated material below said grating edges and having open ends opening to at least one side of said grater, and a scraper member slidably mounted on said base member for relative movement in the transverse direction of said base member parallel to said blades and including notched comb means adapted to embrace said blades and engage within said pockets at their ends opposite to said open ends in substantially close relation to the side surfaces of said blades and the upper surface of said base member, said scraper and base members being relatively movable parallel to said upper grating edges of said blades to remove grated material from said series of pockets through said open ends thereof.

2. The grater as defined in claim 1, further characterized by receptacle means carried by one of said members and arranged to receive grated material removed from said pockets through the open ends thereof as said comb means of said scraper member is relatively moved through said pockets to the open ends thereof.

3. The grater as defined in claim 1, further characterized by receptacle means carried by said base member adjacent the open ends of said pockets to receive grated material removed from said pockets.

4. The grater as defined in claim 1, further characterized by receptacle means carried by said scraper member at the side of said scraper member corresponding to the open ends of said pockets to receive grated material removed from said pockets.

5. The grater as defined in claim 4, wherein said base member is normally disposed within said receptacle means and is adapted through relative movement to said scraper member to be withdrawn therefrom whereby grated material is removed from said pockets and received in said receptacle means.

References Cited in the file of this patent
UNITED STATES PATENTS

| | | |
|---|---|---|
| 588,340 | Kemp | Aug. 17, 1897 |
| 611,447 | Curry | Sept. 27, 1898 |
| 853,725 | Newton | May 14, 1907 |
| 2,108,972 | Orner | Feb. 22, 1938 |
| 2,220,485 | Kashew | Nov. 5, 1940 |
| 2,740,443 | Brown et al. | Apr. 3, 1956 |